United States Patent

Rodriguez-Wong et al.

[11] Patent Number: 5,637,128
[45] Date of Patent: Jun. 10, 1997

[54] GOB DISTRIBUTOR FOR GLASSWARE FORMING MACHINES OR FOR OTHER MATERIALS

[75] Inventors: Gaspar Rodriguez-Wong, Monterrey; Luis Cardenas-Franco, Garza Garcia; Victor Garcia-Gomez, Monterrey, all of Mexico

[73] Assignee: Vidriera Monterrey, S.A., Monterrey, Mexico

[21] Appl. No.: 650,089

[22] Filed: May 17, 1996

Related U.S. Application Data

[63] Continuation of Ser. No. 317,218, Oct. 3, 1994, abandoned, which is a continuation of Ser. No. 997,674, Dec. 28, 1992, abandoned.

[51] Int. Cl.$^6$ .................................................. C03B 7/16
[52] U.S. Cl. ........................... 65/158; 65/164; 65/304
[58] Field of Search ........................... 65/158, 164, 304, 65/225

[56] References Cited

U.S. PATENT DOCUMENTS

| 4,357,157 | 11/1982 | Cardenas-Franco | 65/158 |
|---|---|---|---|
| 4,608,074 | 8/1986 | Knoth | 65/169 |
| 4,723,981 | 2/1988 | Duga | 65/164 |
| 4,740,227 | 4/1988 | Bratton | 65/164 |
| 5,135,559 | 8/1992 | Sasso | 65/225 |

FOREIGN PATENT DOCUMENTS

| 432833 | 6/1991 | European Pat. Off. | 65/304 |
|---|---|---|---|

*Primary Examiner*—John Hoffmann
*Attorney, Agent, or Firm*—Abelman, Frayne & Schwab

[57] ABSTRACT

A gob distributor for glassware forming machines which include at least one curved distribution scoop mounted on a vertical turning shaft, for each one of the gobs which are simultaneously fed by a feeder. A housing which having at least one gear which turns on its axial axis, together with a central shaft, coupled at the housing and, which is coupled in coincidence with the vertical shaft of each one of the distribution scoops. A rack coupled in coincidence with the gears of each one of the distribution scoops to move said gears with a rotational movement and thus, provide a simultaneous and synchronized turn to each one of the scoops. A rotatory driver member coupled to the rack, in order to permit a forward and backward movement of the rack and thus be able to effect the rotational movement of the gears. And driving device coupled to the driver to impart to the same a rotational movement in order to move the rack, and with this, in a simultaneous manner, the curved scoops and angularly towards selective delivery positions, in a programmed sequence and with exact movements between the diverse sections of the forming machine.

4 Claims, 4 Drawing Sheets

GOB DISTRIBUTOR FOR GLASSWARE FORMING MACHINES OR FOR OTHER MATERIALS

This application is a continuation application under 37 C.F.R. 1.62 of prior application Ser. No. 08/317,218, filed on Oct. 3, 1994, now abandoned, which is a continuation under 37 C.F.R. 1.62 of prior application Ser. No. 07/997,674 filed on Dec. 28, 1992, now abandoned.

FIELD OF THE INVENTION

The present invention is referred to a glass gob distributor for glassware forming machines, which effectively and efficiently regulates the diverse movements of its distribution scoops toward the respective forming stations of the machine. The gob distributor is reduced in size and it is constructed more easily than other known gob distributor.

BACKGROUND OF THE INVENTION

In the manufacture of glass articles or other materials, it is necessary to fed gobs of molten glass for the manufacture of glass articles.

These glass gobs are obtained from a feeding source which contains molten glass and thus is able to provide a continuous flow of molten glass, which is continuously shear, through of a shear mechanism, into portions called "gobs", which are distributed by a gob distributor mechanism into one or more cavities of individual forming sections of a glassware forming machine.

The know gob distributors of the prior art generally contain one or more movable distribution scoops, each one of which is supported on a vertical shaft. Said scoops are aligned in such manner that they are moved through adequate mechanisms based on gears, so that said mechanisms are controlled by a moving cam, which makes the scoops move together between a glass article forming station and the next station, in a delivery sequence of predetermined glass gobs, so as to achieve the programmed distribution of the gobs of each one of the forming sections of the machine.

As an example of the gob distributor of the previous art, can be cited the one illustrated in the U.S. Pat. No. : 3,597,187, which was granted to Urban P. Trudeau on Aug. 3, 1971, and assigned to the Owens Illinois Co. This gob distributor consists of a pair of curved scoops, supported by vertical shafts which, through adequate gears, are made to move radially through a gear which is supported on a vertical shaft which moves sequentially through an angle of a predetermined path, through a transversal piston rod which contains a cam follower. Said piston rod is supported on a control cam, which in accordance with its profile, makes that the curved scoops be moved radially between one forming station and the next one, so as to deliver the gobs through a series of set fixed channels which are guided towards the molds of each one of the forming stations of the machine. The control cam is made to turn, itself, by a gear and a screw worm, which is coupled to a shaft. Said shaft is made to turn by a synchronous motor which turn the cam at a constant speed, in synchronization with the operation controls, such as for example, the timing drum which controls the diverse operations of each station of the forming machine.

Another type of gob distributor is illustrated by the U.S. Pat. Re. No. 28,759 granted to Wasyl Bystrianyk et al, on Apr. 6, 1976, and assigned to the Emhart Corporation. This patent also describes a molten glass gobs distributor which essentially includes a pair of curved scoops, each one of which is coupled to a toothed gear, which in turn is coupled to a rack, which permits them to move together, simultaneously, and angularly between one and another position of the glass article forming machine. The rack is coupled itself to a shaft, which at its free end is provided with a cam follower, which in turn is moved by another cam follower, which itself is supported on an adequate cam, which in this particular case, is a horizontal cam. The cam is driven by means of a transmission which is connected to a synchronous motor which makes the cam turn synchronously with the operation controls of the diverse forming sections of the glass article forming machine.

The most recent gob distributors of the previous art already eliminate the use of a motorized cam in order to control the movement of the movable scoops of a glass gob distributor, and its place, they use electronic or stepping motors, such as well as, a control electronic system for the same, such as is illustrated by U.S. Pat. No. 4,357,157, which was granted to Luis Cárdenas Franco, et al, on Nov. 2, 1982 and assigned to Investigación FIC Fideicomiso. In this case, the distributor includes a pair of curved scoops placed one behind the other. The front scoop is provided with a ring support, which is itself supported on a shaft, while the back scoop passes through the aforementioned ring and is supported by a second shaft, in order to carry out the rotating movement at predetermined angles. The shaft of the scoops of distribution pass through a common support, and are coupled by means of an adequate coupling to stepping motors, which operate them in a fully independent manner, through the provision of movements which are perfectly measured by the number of pulses which are fed to each one of the motors. In this case, the stepping motors are operated by an electronic control system which synchronizes the delivery movement of the scoops with respect to each one of the sections of the forming machine.

Another gob distributor of the type that uses programmable means is the one illustrated by the U.S. Pat. No. 4,687,502 granted to Robert J. Douglas et al, and assigned to the company Emhart Industries. This distributor includes a variation to the distribution system described by the U.S. Pat. Re. No. 28,759, which was assigned to said company. In accordance with this invention, the principal characteristics of this gob distributor is the utilization of a servomotor which, is a reversible motor using direct current. This motor positions a rack, which controls the angular movement of the curved scoops for gob delivery. The servomotor is controlled by a servo control positioning mechanism, which itself is controlled by a movement profile through the intervention of a computer which can be manually adjusted. This gob distributor may be considered as being manufactured in two sections, a replaceable section which includes a housing which comprises a pair of toothed pinions which are coupled, respectively, to a pair of feeding scoops. Said pinions, themselves, are coupled to the rack, which makes the two scoops move angularly between one and the other position; and a fixed section which contains the servomotor and a driver of lineal to rotatory movement. This driver may be attached to the principal structure of the glass article forming machine.

However, a disadvantage had by the synchronized distributors that use cams as a movable element for carrying out the movement sequence, which is required by the distribution scoops, is that the cams get considerably worn in view of the fact that they are continually undergoing important efforts to move all of the gob distributing mechanism, so that the surface of the cam is subjected to wear that provokes lack of adjustment in the movement of the distribution channels.

Another considerable disadvantage, which appears because of the mechanical controls based on cams, is that there does not exist the possibility of modifying the operation sequence of these diverse sections of the glass article forming machine, unless the cam is changed by another that is totally different and which contains another sequence.

With the arrival of the electronic controls, the control of the movement of the curved scoops may be handled with great safety, and the programming (adjustment) of the angular position can be easily controlled.

However, one of the problems that still remains with the known gob distributors is with respect to their mechanical structure since they are manufactured with a great quantity of mechanical joining pieces such as guide bars, and other additional pieces which increase considerably its size and weight.

In addition to the above, and due to the large quantity of pieces which make up the known gob distributors, there is the disadvantage in that there exists a great wear in all of the pieces. This provokes disarrangement problems (backlash), which cause rough movements at the time the delivery movement is made, and these cannot be easily corrected by the electrical or electronic controls.

BRIEF SUMMARY OF THE INVENTION

It is an objective of the present invention, to provide a gob distributor for glassware forming machines, having a compact construction, which improves the control of the movement and the position of the distribution scoops.

Another objective of the present invention is to provide a gob distributor for glassware forming machines, which will accept several movement orders for the distribution scoops, without having the need to dismount the mechanism.

An additional objective of the present invention is to provide a gob distributor for glassware forming machines which due to the fact that it is constructed in a compact form the wearing out of the mechanisms is reduced, preventing rough movement problems during the distribution of the gobs to the different sections of the forming machine.

Another objective of the present invention is to provide a gob distributor for glassware forming machines, which provides a movement of the distribution scoops without there being rough acceleration movements.

BRIEF DESCRIPTION OF THE DRAWINGS

The novelty aspects which are considered as characteristics of the present invention will be particularly established through the attached claims. However, the invention itself, both because of the way it is organized as well as by its method of operation, together with its objectives and the additional advantages of the same, will be better understood through the following description when this description is read in relation to the attached drawings, wherein appear the following:

DETAILED DESCRIPTION

Figure 1:
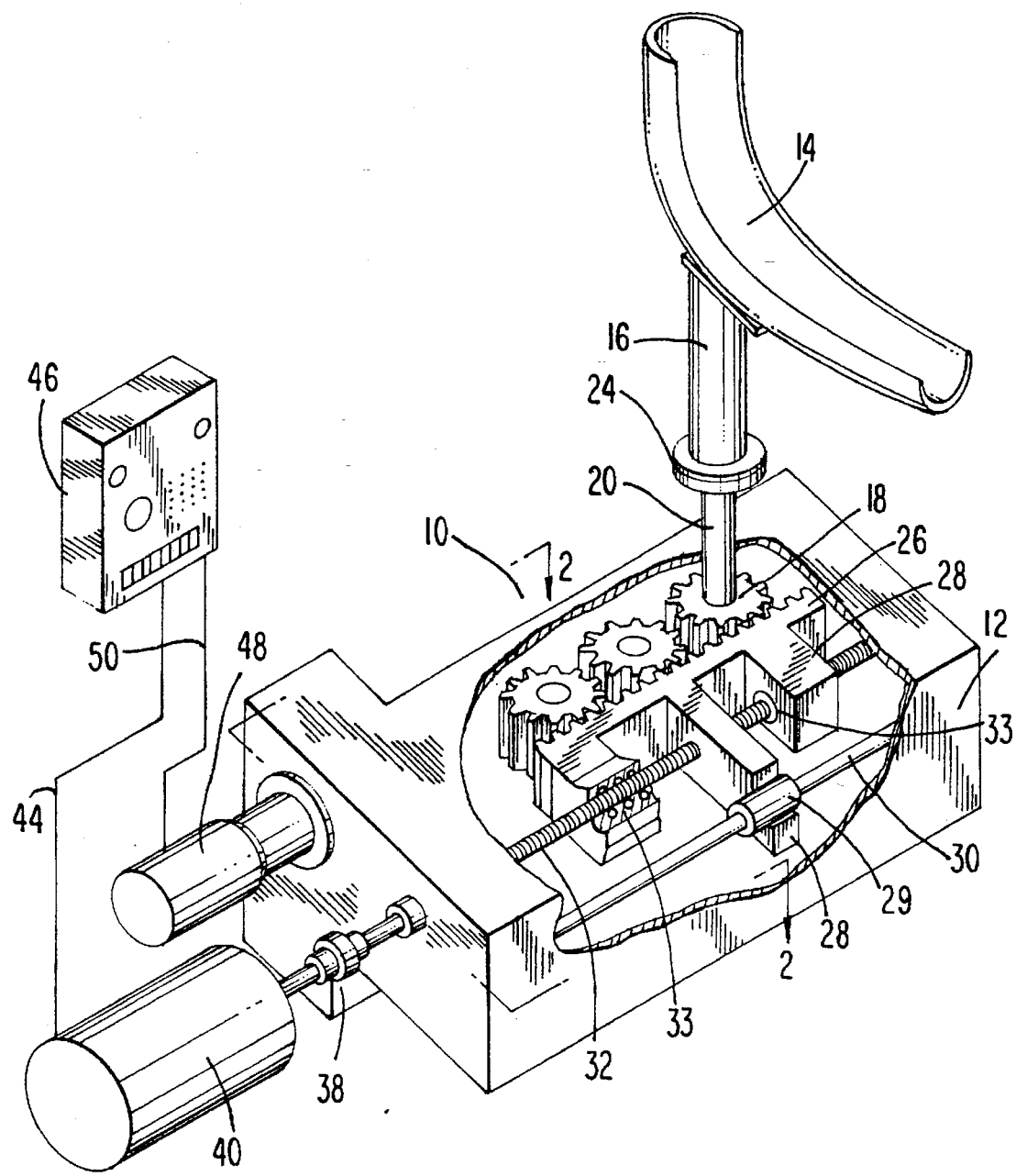
FIG. 1, is view of a conventional cross/cut, perspective of the gob distributor of the present invention.

Making reference to FIG. 1, the gob distributor 10 of the present invention is shown, which, essentially, includes a housing 12. In this embodiment the gob distributor is shown which supports three of the movable delivery scoops 14, of which, only one of them is shown. Each one of the scoops 14, are supported by the vertical shaft 16, which itself, through adequate means, are coupled to a series of annular gears 18, as will be described further on. Said gears 18, will be moved simultaneously in order to make the scoops 14, move in a predetermined and synchronized sequence, towards one of the forming sections of the machine (not shown).

Figure 2:
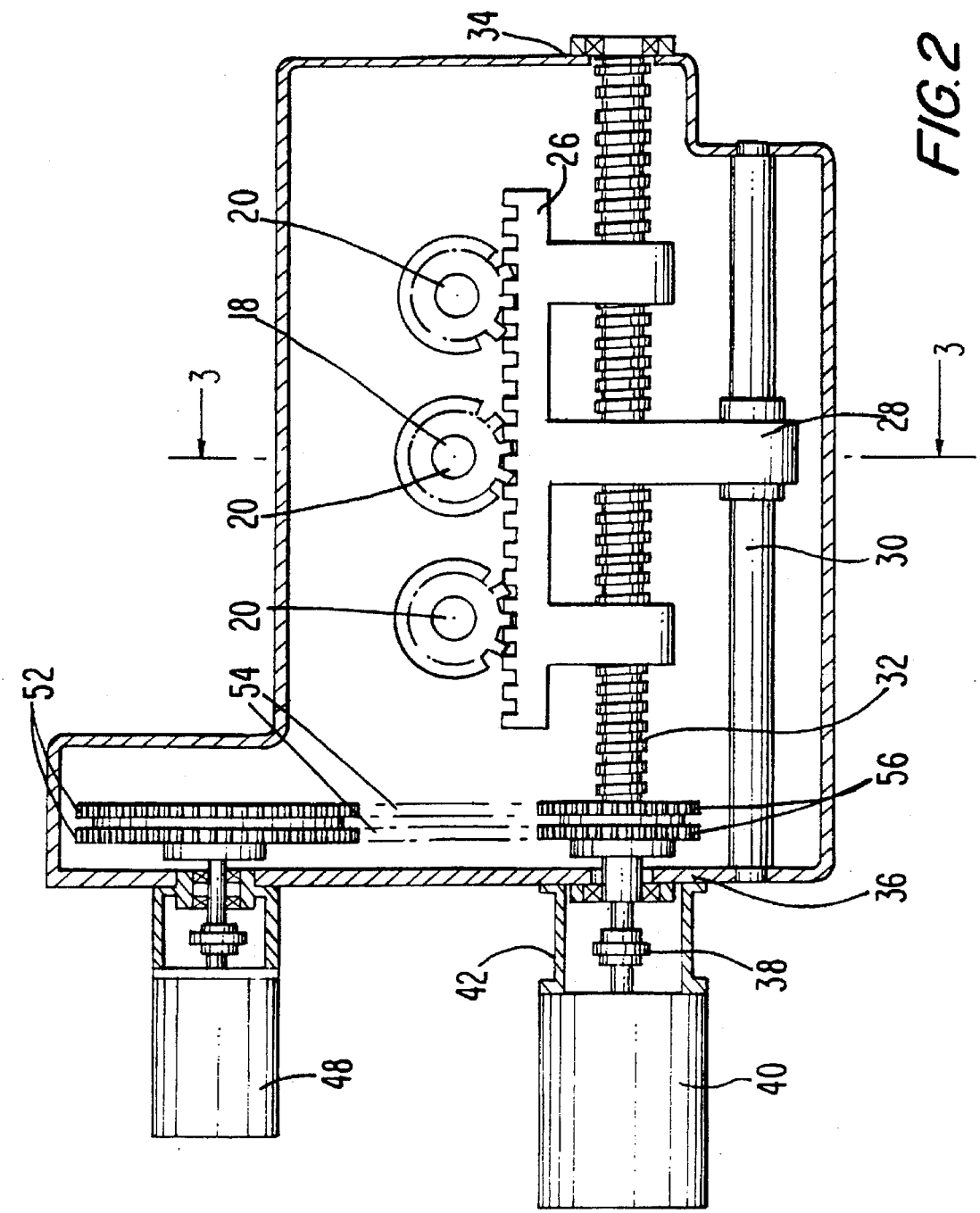
FIG. 2, is a top view, taken on the line 2—2 in FIG. 1.
Figure 3:
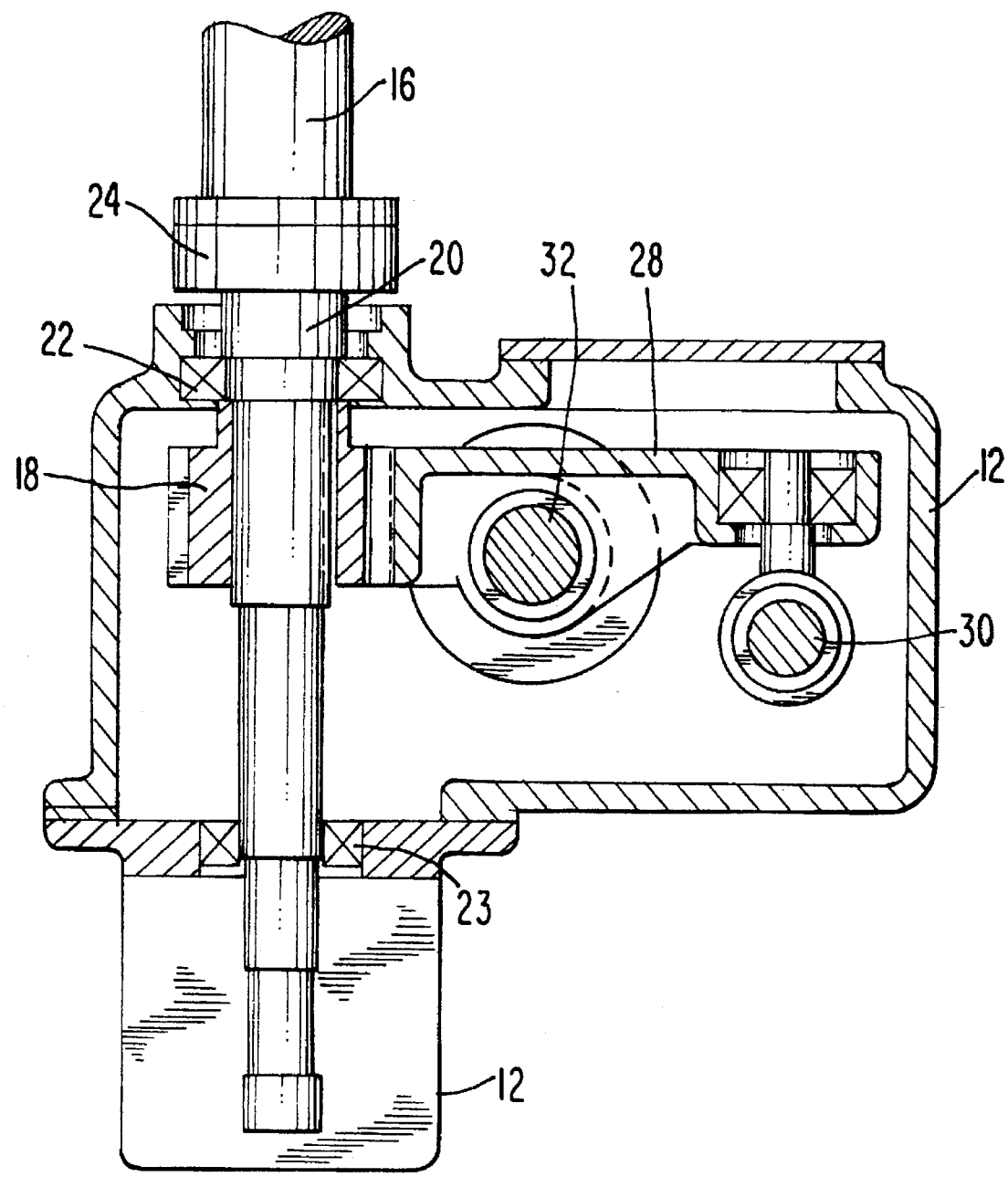
FIG. 3, is a transversal section taken on the line 3—3 in FIG. 2 of the distributor of the present invention which shows the coupling of the rack and the gears.

In the illustrated embodiment of FIGS. 2 and 3, which are attached, the annular gears 18, are fixedly joined to a series of gear bearing shafts 20. The ends of said shafts 20, are coupled to the housing 12, through ball bearings 22, 23, in such a manner that they can rotate vertically on their own vertical axis. The upper part of said shaft 20, includes a delivery support 24, which is the place where each one of the vertical shafts 16, is coupled to the feeding scoops 14.

A rack 26 is meshed with the gears 18, within the housing 12. The rack 26 includes a rack support 28, which itself moves longitudinally in a forward and backward movement over a ball bearing 29 coupled to a guiding bar 30, which is coupled to said housing 12, in order to move together with the rack 26, the gears 18 in unison, each time that said rack support 28 is made to move.

The rack support 28, will be moved in a longitudinal path within the housing 12, with a forward and backward movement through a ball screw 32. Said ball screw 32, is longitudinally coupled through said rack support 28 by means of ball nuts 33 coupled in the rack support 28. One of the ends of the screw 32, is coupled, in order to freely rotate in the lateral section 34 of the housing 12, and at the other end, it crosses the opposite wall 36, of said housing 12 and it is coupled by means of the coupling 38, to the exit shaft of a stepping motor 40. The stepping motor 40, it itself coupled to the outside part of the housing 12 by means of a support 42.

The aforementioned stepping motor 40, itself, is connected through its respective connections 44, to an electronic control system 46. Said motor 40 will receive the movement signal of the control 46, in order to operate in a preestablished sequence, the movement of the delivery scoops 14, to each one of the sections of the glass article forming machine. The preestablished sequence of the motor is based on a cyclical type curve, in order to provide a smooth displacement to the gob feeding scoops 14.

A codifier 48, coupled to the outside part of the housing 12, which, through its respective connections 50, is connected to the control system 46, in order to monitor the position of the stepping motor 40, and send the signal to the control system 46. The codifier 48, which includes two first sprocket gears 52, coupled to the exit shaft, which is located within the housing 12. The two first sprocket gears 52, are connected through two drive chains 54, to two second sprocket gears 56, coupled to the ball screw 32.

In this manner when the control system is operated to function the gob distributor 10, of the present invention, the stepping motor 40, receives the signal of said control 46, and the latter will move through pulses (each pulse of the motor is approximately equivalent to an angle of 0.9 degrees), in keeping with a pre-established movement in said control system 46. Therefore, the stepping motor 40, will, for each pulse it receives from the control, turn in one direction or another, depending on the movement profile stored in said control 40. The movement of said motor 40, will make the ball screw 32, turn on its own axle, which, itself, will drive rack supports 28 and 26, with a longitudinal movement, forwards or backwards. In this manner, the annular gears 18, are made to turn over their own axis, in one direction or in the other, and thus move angularly, the scoops 14 in a determined and synchronized sequence, towards each one of the forming sections of the machine (not shown).

The codifier 48, coupled to the motor through gears 52 and 56, monitors the exact position of said stepping motor 40, and also monitors the direction of the rotation movement, and, sends continuous signals to the control system 46, in order to compare them with the real movement sequence and effect corrections in case this were necessary.

Figure 4:
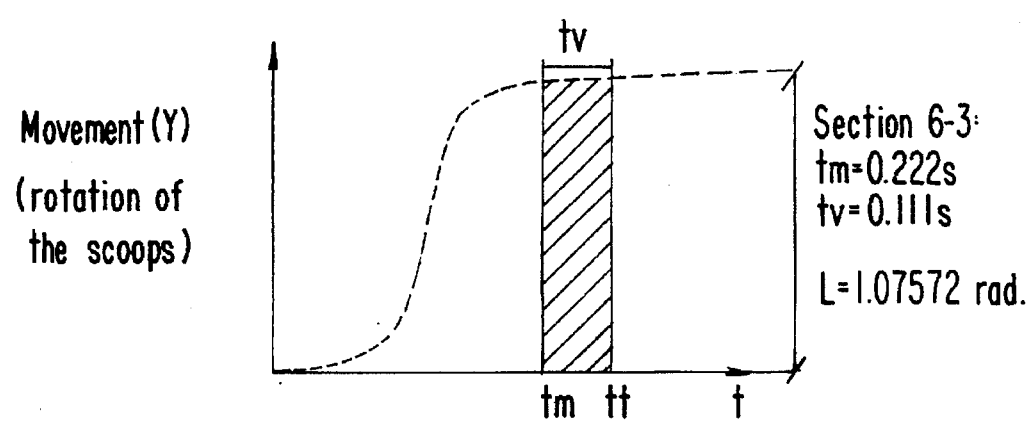
FIG. 4, shows a time/displacement curve of the gob distributor mechanism of the present invention.
Figure 5:
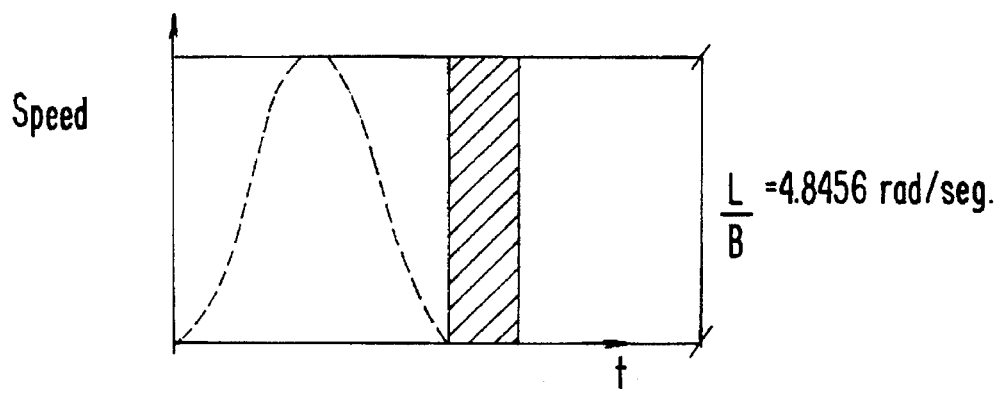
FIG. 5, shows a time/speed curve which corresponds to the displacement profile of FIG. 4; and, FIG. 6 shows a time/acceleration curve which corresponds to the displacement profile of FIG. 4.
Figure 6:
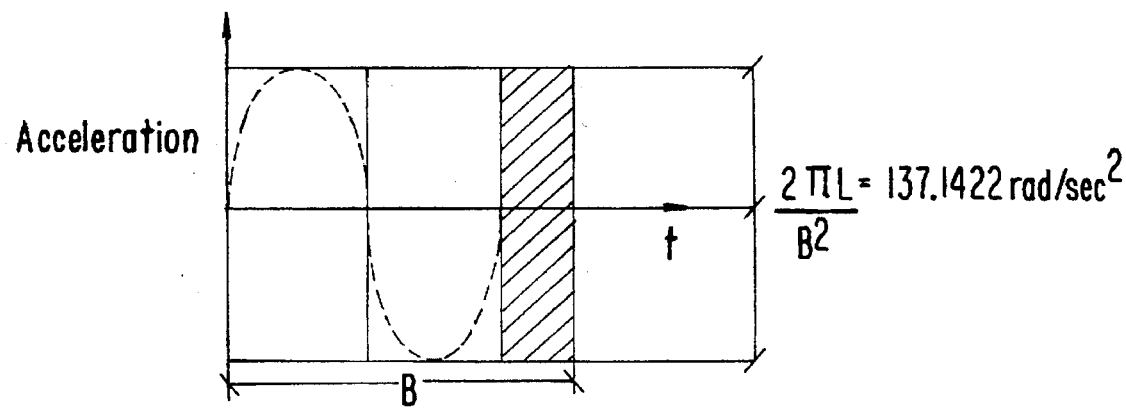

In the previous illustrated embodiment, the profile movement curve of this mechanism is one of a cyclical type, in order to provide a smooth displacement to the gob feeding scoops 14, preventing deformation of the glass gobs, as is shown in the time/displacement curve illustrated in FIG. 4. As can be seen in said FIG. 4, the profile of the displacement is constituted in a time movement tm, which is the time that is used to move the scoops 14, towards each one of the sections of the machine; and, a time of stopping tv, which permits that the glass gobs travel through the scoops at the moment the gob as are delivered. The stated curve prevents vibrations at the end of the movement, assuring, a precise glass gob delivery. FIGS. 5 and 6, correspond to the time/velocity curves, and, time/acceleration curves, which correspond to the displacement profile of FIG. 4.

Due to the fact that the cycloidal curve type is a basic movement curve, its programming is relatively simple. The start-up and stop are smooth. The reason for its excellent operation is that there are no sudden acceleration changes, during the rest and elevation periods of the curve.

As can be seen from the described embodiment which appears above, a compact gob distributor 10 has been illustrated, in order to distribute three glass gobs simultaneously, to each section of the machine. However, it should be understood that there are machines that manufacture one or two articles per section, reason for which, it will be necessary to change said distributor 10, in keeping with the number of molds of each section of the machine.

Finally it should be understood that the invention must not be limited to the embodiment shown above, and it will be apparent, to a specialist in the field, that other diverse mechanical actions can be implemented, such as alternative uses, which will clearly remain contained within the true spirit and scope of the invention, and which are claimed in the following claims.

We claim:

1. Apparatus for distributing glass gobs to a glassware forming machine, comprising:

a housing (12);

at least one shaft (20) supported by said housing (12) for rotation about a longitudinal axis of said at least one shaft, said at least one shaft having a first portion journalled within said housing, and having a second portion extending exteriorly (24) of said housing;

a distributing scoop (14) secured to said second portion (24) of said at least one shaft (20) for rotation in unison with said at least one shaft (20);

a pinion gear (18) secured to said first portion of said at least one shaft (20) at a position interiorly of said housing (12);

a rack gear (26)) supported within said housing (12) for longitudinal sliding movement of said rack within said housing, gear teeth of said rack (26) being meshed with gear teeth of said pinion gear (18), said longitudinal sliding movement of said rack causing rotation of said gear teeth of said pinion gear (18), said pinion gear (38) and said at least one shaft (20);

a ball screw (32) for moving said rack gear (26) longitudinally within said housing (12);

a stepping motor (40) connected to said ball screw (32) for rotating said ball screw (32), and thus to move said rack gear (26) longitudinally within said housing (12);

an electronic control system (46) operative to supply electrical pulses to said stepping motor (40) to step said motor by a determined angular extent of rotation and in a direction of rotation determined by said electronic control system;

an angular displacement codifier (48) connected to said electronic control system (46) and operative to supply signals to said electrical control system (46) accurately representative of an angular extent of rotation and a direction of rotation of said stepping motor (40); and, coupling means for coupling said stepping motor and said codifier; said coupling means comprising: two first sprocket gears (52) coupled to an exit shaft of said codifier (48); two second sprocket gears (56) coupled to an exit shaft of the stepping motor (40); and two drive chains (54) connecting the first and second sprocket gears; whereby control signals are generated by said codifier (48) accurately representative of said angular extent of rotation end said direction of rotation of said stepping motor (40).

2. The apparatus of claim 1, wherein said at least one shaft is supported by said housing, said apparatus including said first portion of said at least one shaft journalled within said housing for rotation about a longitudinal axis, said second portion of said at least one shaft extending exteriorly of said housing, and said distributing scoop being secured to said at least one shaft.

3. The apparatus of claim 2, including said pinion gear secured to said first portion of said at least one shaft, said pinion gear being meshed with said gear teeth of said rack gear.

4. The apparatus of claim 1, wherein the rack gear (26) supported within said housing (12) includes a rack support (28) and the apparatus further comprises a guiding bar (30) supported within said housing (12), said guide bar (30) being extended parallel to the rack gear (26), said rack support (28) being slidable on the guiding bar (30).

* * * * *